United States Patent [19]

Nakajima

[11] Patent Number: 5,099,881
[45] Date of Patent: Mar. 31, 1992

[54] FLOW DIVIDING STRUCTURE OF MASS FLOW CONTROLLER

[75] Inventor: Takeshi Nakajima, Tokyo, Japan

[73] Assignee: Nippon Tylan Corporation, Tokyo, Japan

[21] Appl. No.: 660,552

[22] Filed: Feb. 22, 1991

[30] Foreign Application Priority Data

Aug. 31, 1990 [JP] Japan .................. 2-228077

[51] Int. Cl.⁵ .............................................. G01F 5/00
[52] U.S. Cl. .................................. 137/599.1; 73/202; 138/40; 251/115
[58] Field of Search ............... 137/599.1; 73/197, 202, 73/203; 138/40; 251/117, 118, 122

[56] References Cited

U.S. PATENT DOCUMENTS

| | | | |
|---|---|---|---|
| 1,941,467 | 1/1934 | Fausek et al. | 138/40 X |
| 2,259,592 | 10/1941 | Suvak et al. | 138/45 X |
| 3,107,689 | 10/1963 | Schreiber et al. | 137/599.1 |
| 3,443,417 | 5/1969 | Meyer | 73/202 |
| 4,524,616 | 6/1985 | Drexel et al. | 73/203 |
| 4,886,086 | 12/1989 | Etchells et al. | 138/40 X |

Primary Examiner—Stephen M. Hepperle

[57] ABSTRACT

A flow dividing structure for a mass flow controller includes a base having a main passage which includes an upsream circular passage, a downstream circular passage, and a tapering circular passage which connects the upstream and downstream circular passages. A plug inserted in the main passage includes a first cylindrical portion, a second cylindrical portion and a tapering frustoconical portion. A first annular passage is defined between the first cylindrical portion and the inner circumferential surface of the upstream circular passage. A second annular passage is defined between the second cylindrical portion and the inner circumferential surface of the downstream circular passage. A tapering annular passage is defined between the tapering frustoconical portion and the inner circumferential surface of the tapering circular passage. A flow measuring passage bypasses the tapering circular passage and connects the upstream circular passage with the downstream circular passage.

13 Claims, 3 Drawing Sheets

FLOW DIVIDING STRUCTURE OF MASS FLOW CONTROLLER

FIELD OF THE INVENTION

The present invention relates to a flow dividing structure of a mass flow controller to be used for measurement of a flow of fluid such as gas to be used in a semiconductor manufacturing process.

BACKGROUND OF THE INVENTION

A known mass flow controller is provided with a main passage and a flow measuring passage branched from the main passage. A pair of sensors are provided in the flow measuring passage, so as to measure a mass flow of fluid between the sensors. Unless a ratio of the mass flow in the flow measuring passage to that in the main passage is always constant, there is generated an error in measurement of the mass flow in the mass flow controller as a whole. Therefore, it is necessary to maintain laminar flow in the flow measuring passage and the main passage, so as to maintain the above ratio constant.

Such a mass flow controller is disclosed in Japanese Patent Laid-open Publication No. 60-56219, for example. Referring to FIG. 7 which shows such a prior art mass flow controller 70, the mass flow controller 70 is provided with a base 76 having a tapering circular passage in which a tapering plug 75 is accommodated with a tapering annular passage defined between the same and an inner circumferential surface of the tapering circular passage. Further, an inlet 73 and an outlet 74 of a flow measuring passage 72 open into the tapering annular passage. The plug 75 is not fixed in position causing nonuniformity in the cross section of the tapering annular passage. As a result, fluid flow into the flow measuring passage 72 becomes unstable.

Furthermore, a cross-sectional area of the tapering annular passage at the position of the outlet 74 is smaller than that at the position of the inlet 73. Accordingly, the flow in the tapering annular passage is contracted to cause the formation of very small vortex in the tapering annular passage. This vortex causes instability of the fluid flow into the flow measuring passage 72. Such a tendency of instability of the fluid flow becomes greater as the ratio of the fluid flow in the tapering annular passage to that in the flow measuring passage 72 becomes larger.

Further, it is difficult to form the tapering circular passage through the base 76.

It is accordingly a primary object of the present invention to provide a flow dividing structure of a mass flow controller which can maintain the fluid flow into the flow measuring passage constant and thereby ensure accurate flow measurement.

It is another object of the present invention to provide a flow dividing structure of a mass flow controller which can form a uniform cross section of an annular passage at the position of the inlet of the flow measuring passage to thereby further improve the accuracy of measurement of the fluid flow.

It is a further object of the present invention to provide a flow dividing structure of a mass flow controller which eliminates the need for taper machining of the base to thereby make manufacturing easy.

According to the present invention, there is provided a flow dividing structure of a mass flow controller, comprising a base provided with a main passage having an upstream circular passage, a downstream circular passage, and a tapering circular passage connecting said upstream circular passage with said downstream circular passage; a plug inserted in said main passage and provided with a first cylindrical portion for forming a first annular passage between the same and an inner circumferential surface of said upstream circular passage, a second cylindrical portion for forming a second annular passage between the same and an inner circumferential surface of said downstream circular passage, and a tapering frustoconical portion for forming a tapering annular passage between the same and an inner circumferential surface of said tapering circular passage; and a flow measuring passage connecting said upstream circular passage with said downstream circular passage so as to bypass said tapering circular passage.

With this construction, the flow measuring passage branched from the main passage is formed to connect the first annular passage with the second annular passage, both being parallel to an axis of the main passage, in such a manner as to bypass the tapering annular passage. Accordingly, a laminar flow can be formed in the first annular passage and the second annular passage, thereby stabilizing the fluid flow into the flow measuring passage and ensuring accurate flow measurement.

In a preferred form of the present invention, the first cylindrical portion and/or the second cylindrical portion of the plug may be formed with a plurality of radial projections extending in an axial direction of the plug, and the radial projections are in elastic contact with the inner circumferential surface of the upstream circular passage and/or the downstream circular passage. Accordingly, the cross section of the first annular passage and/or the second annular passage can be made uniform to thereby further improve the accuracy of measurement of the fluid flow.

In another preferred form of the present invention, a sleeve is inserted into a cylindrical bore formed in the base, so that an inner circumferential surface of the sleeve provides the inner circumferential surfaces of the upstream and tapering circular passages, and may additionally provide the inner circumferential surface of the downstream circular passage. Accordingly, it is not necessary to form a tapering bore in the base, thereby making manufacturing easy.

Other objects and features of the invention will be more fully understood from the following detailed description and appended claims when taken with the accompanying drawings.

DETAILED DESCRIPTION OF THE PREFERRED EMBODIMENTS

Figure 1:
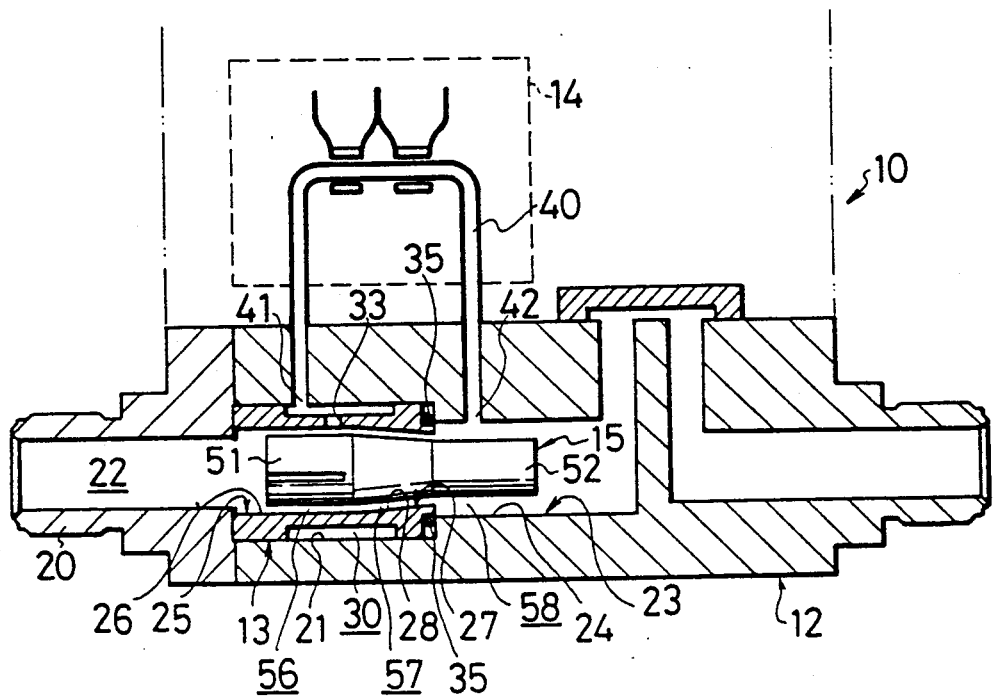
FIG. 1 is a vertical sectional view of the flow dividing structure of the mass flow controller according to a first preferred embodiment of the present invention.

Referring to FIG. 1 which shows a preferred embodiment of the present invention, reference numeral 10 generally designates a mass flow controller including a base or housing 12, a sensor portion 14 and a fluid introducing portion 20 mounted to an upstream end of the base 12.

The base 12 is formed at its upstream portion with a large-diameter cylindrical bore 21 for accommodating a sleeve 13 and a plug 15. A downstream circular passage 23 having a diameter smaller than that of the cylindrical bore 21 is also formed in the base 12 so as to continue coaxially from a downstream end of the cylindrical bore 21.

Reference numeral 40 designates a flow measuring passage having an inlet 41 opening into the cylindrical bore 21 and an outlet 42 opening into the downstream circular passage 23. The flow measuring passage 40 extends through the sensor portion 14 outside of the base 12, so that a mass flow of fluid flowing in the flow measuring passage 40 is measured in the sensor portion 14 using conventional sensors.

Figure 2:
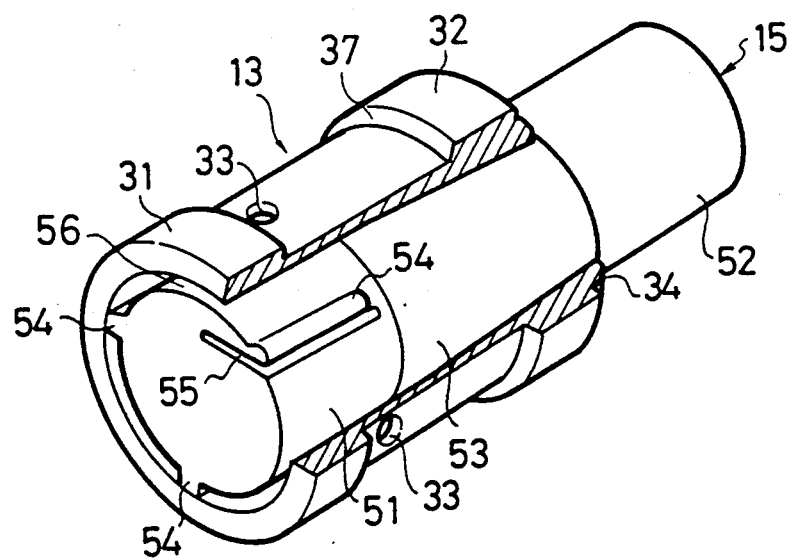
FIG. 2 is a perspective view of a sleeve and a plug shown in FIG. 1.

Referring to FIG. 2, the sleeve 13 is formed at its outer circumference with a pair of axially spaced large-diameter portions 31 and 32 which form an annular recess 37 therebetween. Accordingly, when the sleeve 13 is inserted in the cylindrical bore 21 as shown in FIG. 1, the annular recess 37 of the sleeve 13 serves to define an annular chamber 30 in cooperation with an inner circumferential surface of the cylindrical bore 21. The inlet 41 of flow measuring passage 40 opens into the annular chamber 30. An inner circumferential surface of the sleeve 13 serves as an inner circumferential surface 26 of an upstream circular passage 25 and an inner circumferential surface 28 of a tapering circular passage 27. The inner circumferential surface 26 of the upstream circular passage 25 is formed with three radially extending communication holes 33 circumferentially spaced apart from each other for communicating a main passage 22 with the annular chamber 30. Further, an axially opening annular recess 34 is formed at the downstream end of the sleeve 13 for receiving an annular seal ring 35. Accordingly, when the sleeve 13 is inserted in the cylindrical bore 21 as shown in FIG. 1, the seal ring 35 is interposed between the cylindrical bore 21 and the downstream circular passage 23 to thereby prevent the fluid from being leaked from the annular chamber 30 to the downstream circular passage 23. The seal ring 35 is retained in the recess 34 by an axially facing shoulder defined on base 12 between the bore 21 and the smaller diameter downstream passage 23.

The plug 15 is comprised of a first cylindrical portion 51 having an axis parallel to that of the sleeve 13 and forming an upstream portion to be accommodated in the upstream circular passage 25, a second cylindrical portion 52 having an axis parallel to that of the sleeve 13 and forming a downstream portion be accommodated in the downstream circular passage 23, and a tapering frustoconical portion 53 formed between the first cylindrical portion 51 and the second cylindrical portion 52 and adapted to be accommodated in the tapering circular passage 27. The first cylindrical portion 51 has a diameter larger than that of the second cylindrical portion 52, and the tapering frustoconical portion 53 has a diameter gradually decreasing from the first cylindrical portion 51 to the second cylindrical portion 52. The first cylindrical portion 51 is formed at its outer circumference with three projections or ribs 54 projecting radially outwardly and extending in the axial direction in circumferentially equally spaced relationship with each other. At least one of the projections 54 is formed at its root portion with a slit 55 extending in the axial direction through the first cylindrical portion 51. The slit 55 defines part of a chord (i.e. is in tangential relationship) relative to the first cylindrical portion 51.

The sleeve 13 and the plug 15 are assembled with the base 12 in the following manner.

First, the sleeve 13 is inserted into the cylindrical bore 21 of the base 12, so that the upstream circular passage 25 and the tapering circular passage 27 are formed in the sleeve 13. The upstream circular passage 25 is communicated through the three communication holes 33 to the annular chamber 30.

Then the plug 15 is press-fitted into the sleeve 13 by utilizing elastic deformation of the one projection 54 due to the slit 55. Under such a press-fitted condition, the three projections 54 of the plug 15 are maintained in elastic contact with the inner circumferential surface 26 of the upstream circular passage 25. Accordingly, the plug 15 is fixed in substantially concentric relationship with the sleeve 13. As a result, there is defined a first annular passage 56 having an axis parallel to that of the sleeve 13 and having a uniform cross section (i.e., radial width) between the inner circumferential surface 26 of the upstream circular passage 25 and the outer circumferential surface of the first cylindrical portion 51 of the plug 15. Further, there is defined a tapering annular passage 57 having a uniform cross section (i.e., radial width) between the inner circumferential surface 28 of the tapering circular passage 27 and the outer circumferential surface of the tapering frustoconical portion 53 of the plug 15. Further, there is defined a second annular passage 58 having an axis parallel to that of the plug 15 and having a uniform cross section (i.e. radial width) between an inner circumferential surface 24 of the downstream circular passage 23 and the outer circumferential surface of the second cylindrical portion 52 of the plug 15. In press-fitting the plug 15 into the sleeve 13, it is preferable to position the projections 54 and the communication holes 33 at angles of about 60 degrees therebetween. That is, the plug 15 would be circumferentially oriented relative to the sleeve 13 such that the projections 54 are located circumferentially midway between respective circumferentially adjacent pairs of holes 33. Thus, the holes 33 and projections 54 would be circumferentially alternatingly disposed and spaced at 60° intervals.

In the assembled condition as mentioned above, the fluid in the mass flow controller 10 is divided to flow in the main passage 22 comprising the first annular passage 56, the tapering annular passage 57 and the second annular passage 58, and flow in the branch passage comprising the communication holes 33, the annular chamber 30, the inlet 41, the flow measuring passage 40 and the outlet 42.

The flow of the fluid into the flow measuring passage 40 is defined according to an amount of insertion of the plug 15 into the sleeve 13. That is, the flow passage area of the tapering annular passage 57 is changed by changing the amount of insertion of the plug 15, with the result that a pressure loss (pressure difference) between the inlet 41 and the outlet 42 of the flow measuring passage 40 is changed to cause a change in the flow into the flow measuring passage 40. The amount of insertion of the plug 15 can be adjusted by gradually inserting the plug 15 into the sleeve 13 using a jig such as a rod member while monitoring an output from the sensor portion 14. The insertion of the plug 15 into the sleeve 13 can be easily carried out because the slit 55 is formed in the plug 15.

According to the above-mentioned preferred embodiment, since the inlet 41 and the outlet 42 of the flow measuring passage 40 open respectively into the first annular passage 56 and the second annular passage 58, both of which are parallel to the axis of the main passage 22, fluid in a laminar flow condition can be taken into the flow measuring passage 40. That is, the annular passages 56 and 58 function as a straightening element. Furthermore, the three projections 54 of the plug 15 are in elastic contact with the inner circumferential surface 26 of the upstream circular passage 25 to define the annular passage 56 having a uniform cross section, and the fluid is taken from the inlet 41 which opens into the annular passage 56. Therefore, accurate flow measurement can be carried out in the sensor portion 14. Further, there is no possibility of a change in flow condition in the tapering annular passage 57. In contrast, such flow condition changes can occur in the prior art and cause an unstable flow into the prior art flow measuring passage.

Additionally, if the cross-sectional area of the first annular passage 56 and the cross-sectional area of the second annular passage 58 are designed so as to make the flow velocity in the first annular passage 56 equal to that in the second annular passage 58, then the stability of the flow in the flow measuring passage 40 can be further improved.

FIGS. 3 to 6 show various other embodiments of the present invention, in which the construction is substantially the same as that shown in FIGS. 1 and 2 in such a respect that the inlet and the outlet of the flow measuring passage are so formed as to open respectively into the first annular passage and the second annular passage, both of which are parallel to the axis of the main passage. However, the following embodiments are different from the previous embodiment (FIGS. 1-2) in respect of the structures of the sleeve, the plug and the seal between the inlet and the outlet of the flow measuring passage.

Figure 3:
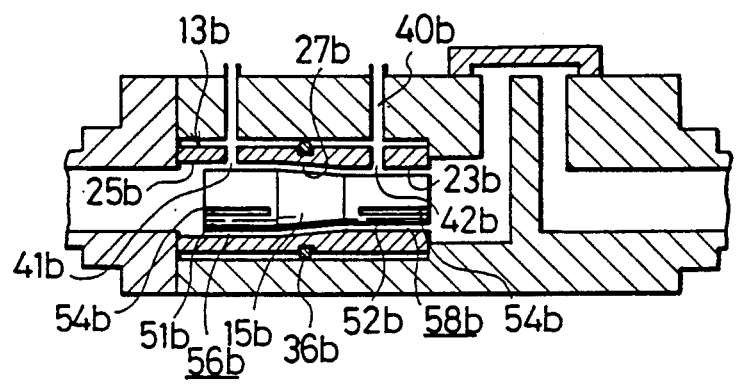
FIGS. 3 to 6 are views similar to FIG. 1, showing other embodiments of the present invention.

Referring to FIG. 3, a sleeve 13b has a structure providing an upstream circular passage 25b, a tapering circular passage 27b and a downstream circular passage 23b. Both a first cylindrical portion 51b and a second cylindrical portion 52b of a plug 15b are formed with projections 54b, so as to make the cross sections of a first annular passage 56b and a second annular passage 58b uniform. An O-ring seal 36b is provided between an inlet 41b and an outlet 42b of a flow measuring passage 40b, so as to prevent leakage of the fluid from the inlet 41b to the outlet 42b.

Figure 4:
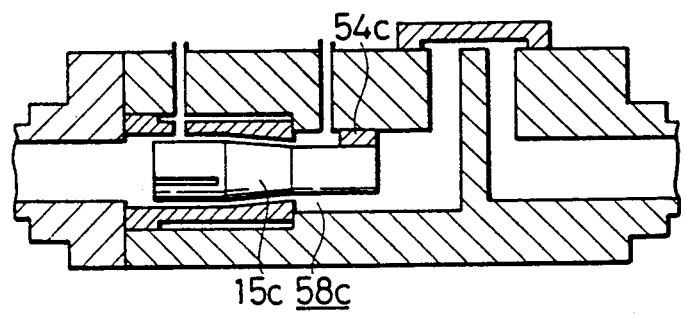

Referring to FIG. 4, a radial spacer 54c is interposed between a second cylindrical portion of a plug 15c and a downstream circular passage, so as to make the cross section of a second annular passage 58c uniform.

Figure 5:
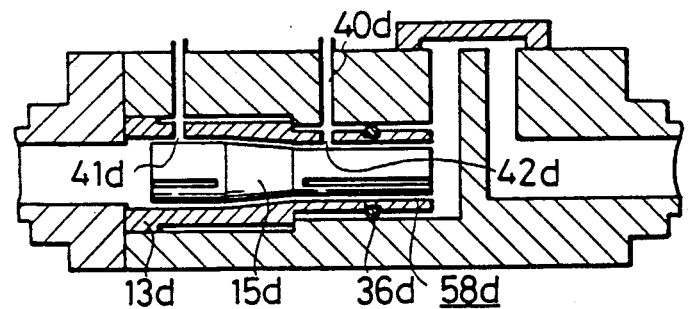

Referring to FIG. 5, a sleeve 13d and a plug 15d have substantially the same length which is larger than that shown in FIG. 1, and a second annular passage 58d is formed between the sleeve 13d and the plug 15d. The seal structure between an inlet 41d and an outlet 42d of a flow measuring passage 40d is the same as that shown in FIG. 1, but the corresponding seal ring is not shown in FIG. 5. Further, an O-ring 36d is provided on a small-diameter downstream portion of the sleeve 13d, so as to prevent turbulence in the fluid flow at the outlet 42d of the flow measuring passage 40d.

Figure 6:
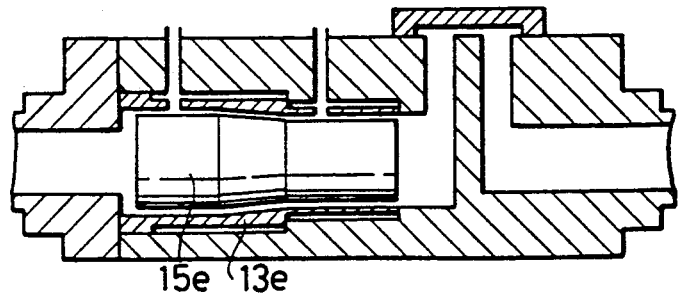
Figure 7:
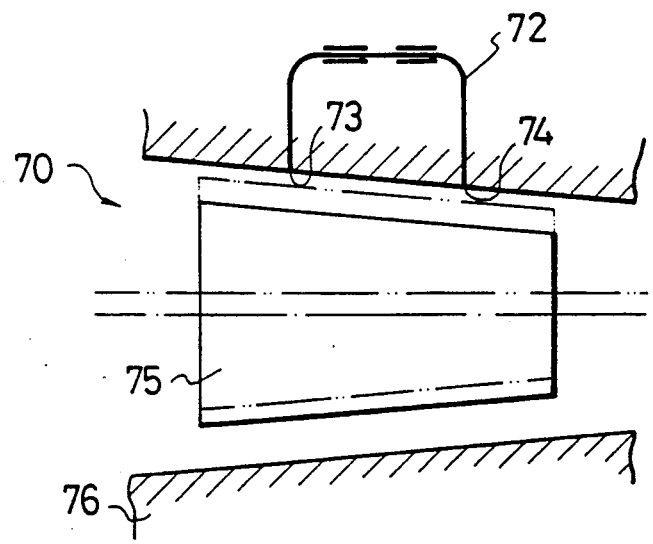
FIG. 7 is a vertical sectional view of an essential part of the flow dividing structure of the mass flow controller in the prior art.

Referring to FIG. 6, a sleeve 13e and a plug 15e are similar to those shown in FIG. 5, but they have increased diameters so as to increase the flow passage area.

While the invention has been described with reference to specific embodiments, the description is illustrative and is not to be construed as limiting the scope of the invention. Various modifications and changes may occur to those skilled in the art without departing from the spirit and scope of the invention as defined by the appended claims.

The embodiments of the invention in which an exclusive property or privilege is claimed are defined as follows:

1. A flow dividing structure of a mass fluid flow controller, comprising:

a housing provided with a main passage for fluid flow therethrough, said main passage having an upstream circular passage, a downstream circular passage, and a tapering circular passage coaxially connecting said upstream circular passage with said downstream circular passage;

a plug inserted in said main passage and provided with a first cylindrical portion for forming a first annular passage between an outer peripheral surface thereof and an inner circumferential surface of said upstream circular passage, a second cylindrical portion for forming a second annular passage between an outer peripheral surface thereof and an inner circumferential surface of said downstream circular passage, and a tapering frustoconical portion for forming a tapering annular passage between an outer peripheral surface thereof and an inner circumferential surface of said tapering circular passage, said first and second cylindrical portions extending axially from respectively opposite axial ends of said frustoconical portion, each of said first and second cylindrical portions having a uniform diameter throughout the axial extent thereof; and a flow measuring passage connecting said upstream circular passage with said downstream circular passage.

2. The structure according to claim 1 wherein a plurality of axially extending projections are formed on one of said first and second cylindrical portions, said projections being press-fitted into engagement with the inner circumferential surface of one of said upstream and downstream circular passages.

3. The structure according to claim 2 further including a sleeve which is fitted into a bore formed within the housing and which defines the inner circumferential surfaces of said upstream and tapering circular passages.

4. The structure according to claim 3 wherein said sleeve further defines the inner circumferential surface of said downstream circular passage.

5. The structure according to claim 1 further including a sleeve which is fitted into a bore formed within the base and which defines the inner circumferential surfaces of said upstream and tapering circular passages.

6. The structure according to claim 5 wherein said sleeve further defines the inner circumferential surface of said downstream circular passage.

7. The structure according to claim 1, wherein said flow measuring passage bypasses said tapering circular passage.

8. The structure according to claim 3, wherein one of said projections is elastically deformable to permit the plug to be concentrically seated within said sleeve.

9. The structure according to claim 1, wherein said outer peripheral surfaces of said first and second cylindrical portions contiguously adjoin said outer peripheral surface of said frusto-conical portion.

10. The structure according to claim 9, wherein said outer peripheral surface of each said cylindrical portion and said adjoining outer peripheral surface of said frustoconical portion define therebetween an obtuse angle.

11. The structure according to claim 9, wherein said cylindrical portions of said plug have respective axial lengths which are at least as long as the axial length of said frusto-conical portion.

12. The structure according to claim 1, wherein each of said upstream and downstream circular passages extends axially away from said tapering circular passage and has a uniform diameter.

13. The structure according to claim 2, wherein said one cylindrical portion has an internal slit therein, said internal slit extending inwardly into said one cylindrical portion from said outer peripheral surface thereof, and one of said projections being disposed on said outer peripheral surface of said one cylindrical portion immediately adjacent said internal slit to permit movement of said one projection relative to said one cylindrical portion.

* * * * *

UNITED STATES PATENT AND TRADEMARK OFFICE
CERTIFICATE OF CORRECTION

PATENT NO. : 5 099 881
DATED : March 31, 1992
INVENTOR(S) : Takeshi Nakajima

It is certified that error appears in the above-identified patent and that said Letters Patent is hereby corrected as shown below:

ON THE TITLE PAGE:

In the Abstract, line 3; change "upsream" to ---upstream---.

Column 6, line 58; change "base" to ---housing---.

Signed and Sealed this

Twenty-first Day of September, 1993

Attest:

BRUCE LEHMAN

Attesting Officer     Commissioner of Patents and Trademarks